(12) United States Patent
Gumm (10) Patent No.: US 7,878,478 B2
(45) Date of Patent: Feb. 1, 2011

(54) BASE ASSEMBLY FOR SUPPORTING AND TRANSPORTING A FREE STANDING STRUCTURE

(76) Inventor: David M. Gumm, 2430 Aspen Rd., #304, Ames, IA (US) 50010

( * ) Notice: Subject to any disclaimer, the term of this patent is extended or adjusted under 35 U.S.C. 154(b) by 128 days.

(21) Appl. No.: 12/341,404

(22) Filed: Dec. 22, 2008

(65) Prior Publication Data

US 2010/0155548 A1 Jun. 24, 2010

(51) Int. Cl.
*F16M 13/00* (2006.01)
(52) U.S. Cl. .................. 248/529; 248/910; 135/121; 135/141
(58) Field of Classification Search .............. 248/558, 248/515, 514, 460, 165, 910; 135/121, 139, 135/140, 141, 142
See application file for complete search history.

(56) References Cited

U.S. PATENT DOCUMENTS

| | | | | |
|---|---|---|---|---|
| 473,016 | A | * | 4/1892 | Pattee .................. 135/75 |
| 1,631,227 | A | | 6/1927 | See |
| 2,933,274 | A | | 4/1960 | Mausolf |
| 3,119,588 | A | | 1/1964 | Keats |
| 3,415,475 | A | | 12/1968 | Goodman |
| 3,820,246 | A | | 6/1974 | Evans, Jr. |
| 4,176,458 | A | | 12/1979 | Dunn |
| 4,406,437 | A | | 9/1983 | Wright |
| 5,000,211 | A | | 3/1991 | Speare et al. |
| 5,088,680 | A | | 2/1992 | Farmer |
| 5,178,356 | A | | 1/1993 | Schouwey |
| 5,248,157 | A | | 9/1993 | Rice |
| 5,354,031 | A | | 10/1994 | Bilotti |
| 5,634,482 | A | | 6/1997 | Martin |
| 5,823,898 | A | | 10/1998 | Wang |
| 5,836,838 | A | | 11/1998 | van Nimwegen et al. |
| 5,924,832 | A | | 7/1999 | Rice |
| 5,979,844 | A | | 11/1999 | Hopkins |
| 6,036,161 | A | * | 3/2000 | O'Shea .................. 248/532 |
| 6,068,008 | A | | 5/2000 | Caldwell |
| 6,113,054 | A | | 9/2000 | Ma |
| 6,361,057 | B1 | | 3/2002 | Carter |
| 6,446,930 | B1 | | 9/2002 | Li |
| 6,575,853 | B1 | | 6/2003 | O'Neill et al. |
| 6,619,610 | B1 | | 9/2003 | Genovese |
| 6,869,058 | B2 | | 3/2005 | Tung |
| 6,981,680 | B1 | | 1/2006 | Gordon et al. |
| 7,240,885 | B1 | | 7/2007 | Sullivan |
| 7,273,198 | B2 | | 9/2007 | Tourtellotte et al. |
| 7,353,833 | B1 | | 4/2008 | Palmer |
| 7,380,563 | B2 | | 6/2008 | Seo |
| 2005/0189005 | A1 | | 9/2005 | Smith et al. |

OTHER PUBLICATIONS

International Search Report and Written Opinion for PCT/US2009/068500, dated Feb. 12, 2010, 10 pages.

\* cited by examiner

*Primary Examiner*—Gwendolyn Baxter
(74) *Attorney, Agent, or Firm*—Fredrikson & Byron, PA (57) ABSTRACT

Embodiments of the invention provide a base assembly for supporting a free standing structure such as a tent. The base assembly is configurable such that a base can be positioned in a generally horizontal orientation to support and stabilize a stationary structure. In some cases the base can be positioned in a generally vertical orientation to allow the base assembly to roll along a support surface, thus providing a ready and easily configurable manner of transporting the base assembly and any structure attached thereto.

22 Claims, 8 Drawing Sheets

FIG. 8

BASE ASSEMBLY FOR SUPPORTING AND TRANSPORTING A FREE STANDING STRUCTURE

BACKGROUND

Free standing structures such as tents, display stands, signs, and the like are often used for outdoor events such as trade shows, fairs, sales events, and a variety of other outdoor gatherings. Such free standing structures may also be used indoors for similar purposes. These type of structures generally include at least one leg and a foot for supporting a framework upon a support surface such as a floor, street, earthen ground, etc.

Especially, though not exclusively, for outdoor events, it is desirable to secure a free standing structure to a support surface to prevent the structure tipping from, e.g., wind or an unbalanced load. For example, legs may be weighted to prevent the structure from tipping. Weight is typically provided by bulky, concrete blocks, large PVC pipe filled with concrete, sandbags, and other heavily weighted objects. Unfortunately, the very weight needed to stabilize the structure can make these objects difficult to unload and transport, which must often be accomplished by hand. Weighted objects of this nature can be difficult and awkward to carry and handle, take up substantial space during transport or storage due to their bulky size, and also can present hazards to people due to their bulky size and/or rough or sharp edges.

In some cases legs may be staked to the ground for stability. Stakes driven into the ground can pull loose, though, due to, for example, water-saturated ground or high winds. In addition, the ropes used to stake down a structure can present a tripping hazard for people. At times, stakes cannot be used at all, such as for events held on parking lots, streets, or indoors.

In addition, the free standing structure itself can be awkward and difficult to transport prior to set up. For example, temporary, collapsible structures (e.g., temporary shelters such as tents) are available for easy and rapid set up and tear down. However, such structures must often be transported from a vehicle or storage facility to the desired set up location and back by multiple individuals and/or with the use of a cart or dolly. Accordingly, there remains a desire for improved methods and devices for stabilizing and transporting a free standing structure.

SUMMARY

Embodiments of the invention provide a base assembly for supporting a free standing structure such as a tent. The base assembly includes a first shaft extending from the top surface of a base and a second shaft adapted to removably couple to a leg of the structure. The second shaft has a first opening adapted to receive the first shaft with the base in a generally horizontal orientation for supporting the base assembly in a stationary position. The second shaft further includes a second opening adapted to receive the first shaft with the base in a generally vertical orientation for transporting the base assembly. In this generally vertical orientation, the base may rotate with respect to the second shaft to provide an easily configurable mode of transportation for the base assembly and any structure attached thereto.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Figure 1:
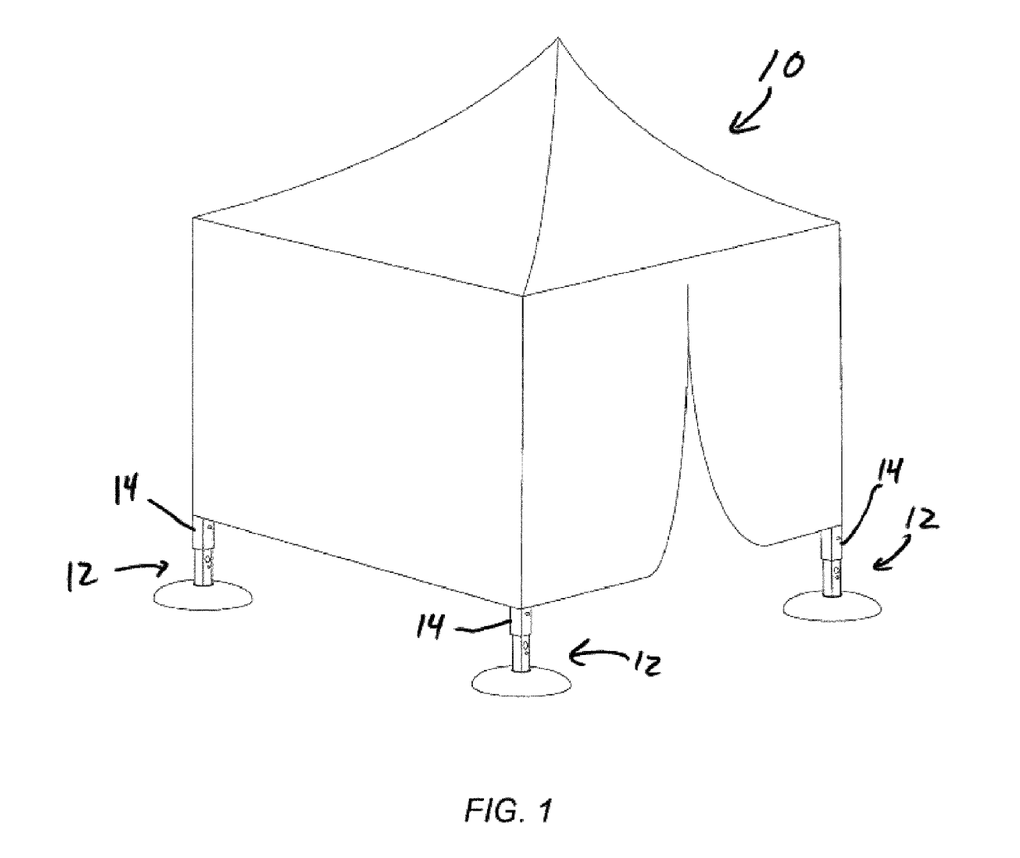
FIG. 1 is a perspective view of a free standing structure supported by a number of base assemblies according to an embodiment of the invention.

Referring to FIG. 1, a perspective view of a free standing structure 10 supported by multiple base assemblies 12 is shown according to one embodiment of the present invention. In this particular embodiment, and throughout this specification, the free standing structure 10 will be referred to as a tent 10 for ease of reference, although the structure 10 is not limited to such, and may be embodied in a variety of forms. For example, a free standing structure may include a display rack or stand, a sign, a booth, and many other structures. It will be appreciated that the base assemblies 12 taught herein may be used to support and transport these and other structures according to various embodiments.

The structure or tent 10 generally includes a framework with at least one, and in the illustrated embodiment, a total of four legs 14 for supporting the framework. The base assemblies 12 are adapted to removably couple to the legs 14, thus providing a stable footing for the tent 10. As will be described further herein, in some embodiments the base assemblies 12 may be weighted to provide a stabilizing force for the tent 10. In other embodiments, the base assemblies may be configured for movement to facilitate transportation of the base assemblies and/or the tent 10.

Figure 2:
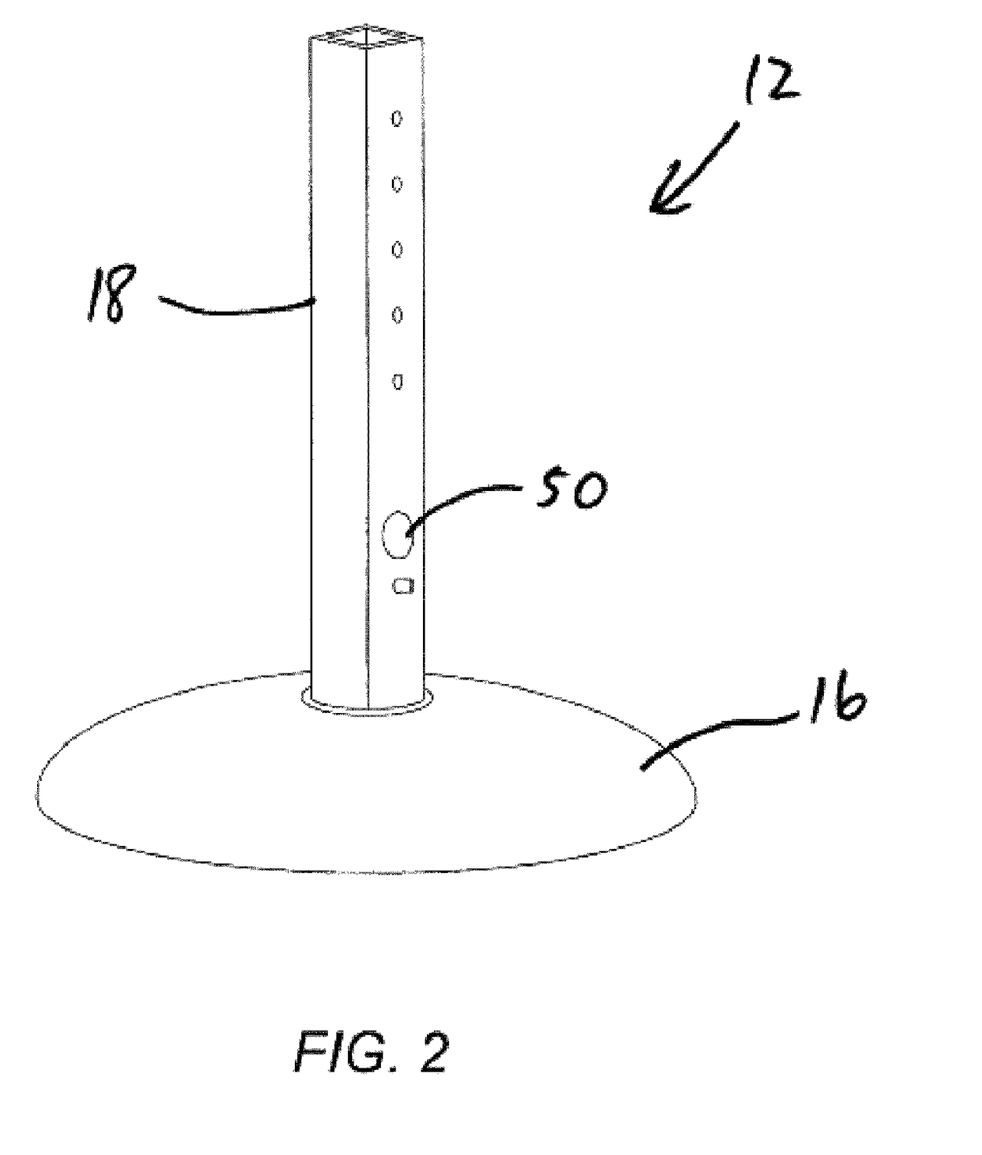
FIG. 2 is a perspective view of a base assembly in a horizontal orientation according to an embodiment of the invention.

Referring to FIG. 2, a perspective view of a base assembly 12 according to one embodiment is shown. The base assembly 12 generally includes a base 16 adapted to rest upon a support surface and a shaft 18 (e.g., tube). For example, the base 16 may be generally flat or low to the ground to provide a large amount of stability. In the embodiment shown, the shaft 18 is coupled to the base 16 and is adapted to couple with one of the tent legs 14 shown in FIG. 1. For example, in some cases, tents and other free standing structures include legs (e.g., tent legs 14 in FIG. 1) supplied with removable or adjustable feet or other support platforms. According to some embodiments, the base assembly 12 can replace a standard foot supplied with a tent leg to provide an improved support.

Figure 3:
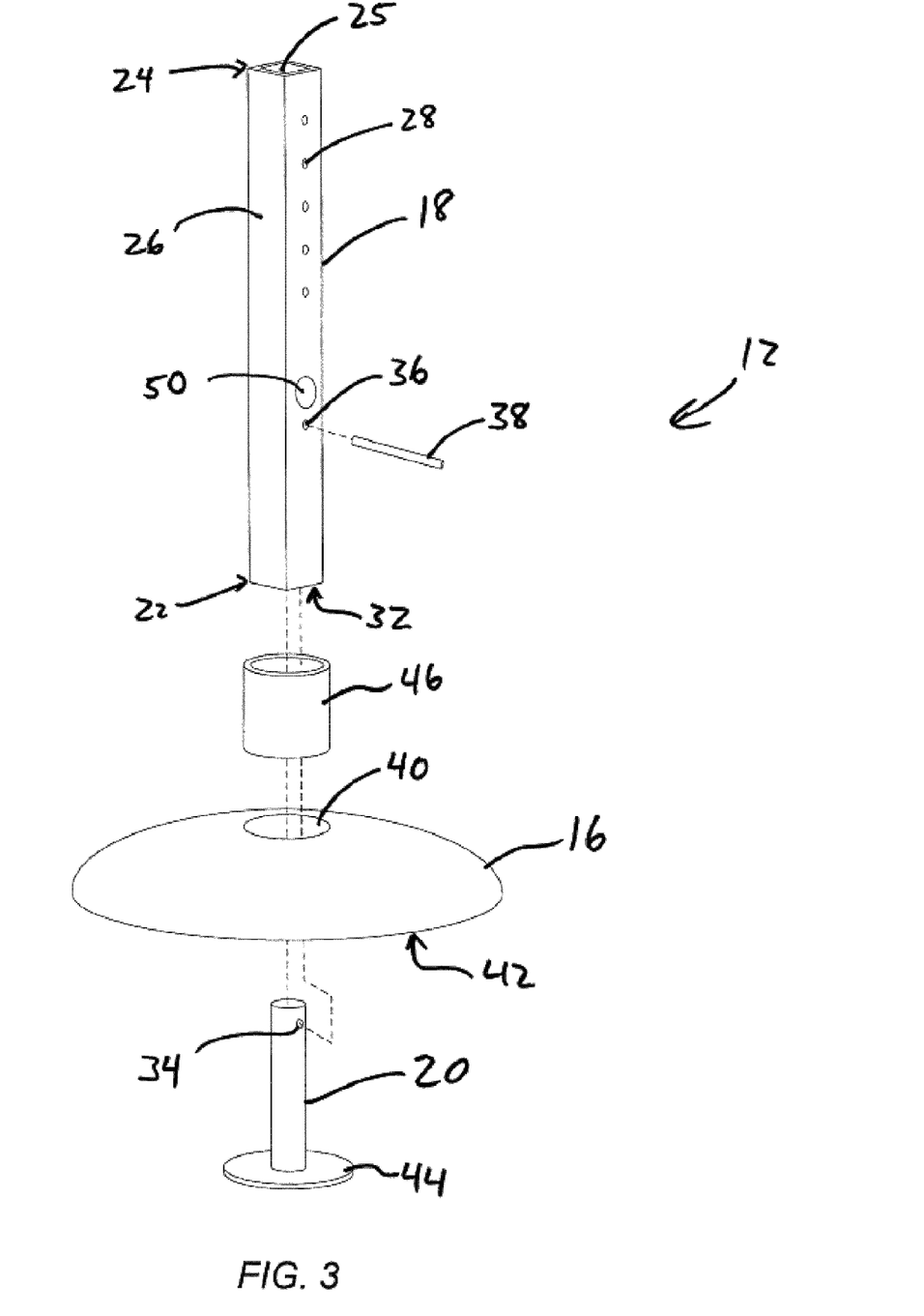
FIG. 3 is an exploded, perspective view of the base assembly of FIG. 2.
Figure 4:
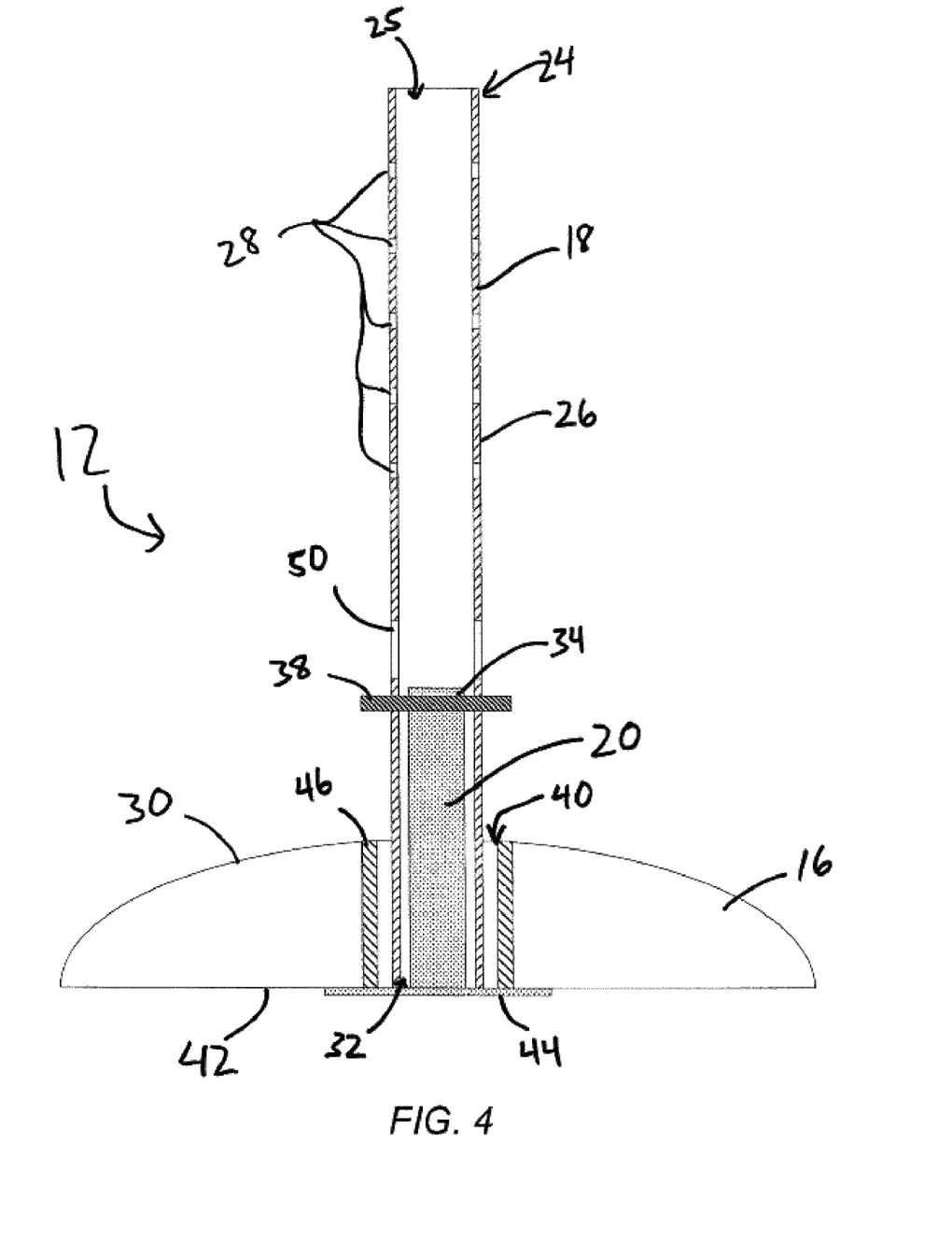
FIG. 4 is a cross-sectional view of the base assembly of FIG. 2.
Figure 5:
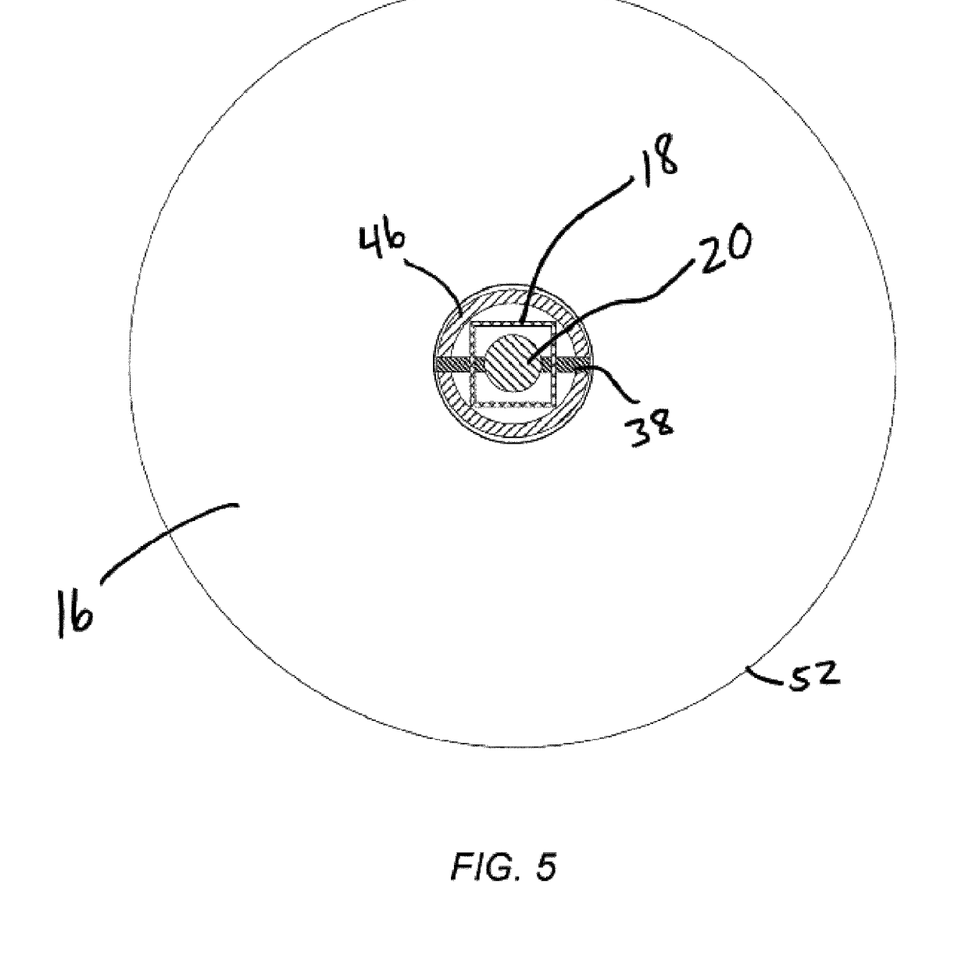
FIG. 5 is a top view of the base assembly of FIG. 2

Referring to FIG. 3, an exploded perspective view of the base assembly 12 in FIG. 2 is shown. According to this embodiment, the base assembly 12 includes a stub shaft 20 that couples the shaft 18 together with the base 16. FIGS. 4 and 5 show additional views of the base assembly 12 of FIG. 2. FIG. 4 shows the base assembly 12 in cross-section, while FIG. 5 shows a top view of the base assembly 12 according to some embodiments.

Referring to FIGS. 2-5, the shaft 18 generally includes a first end 22 and a second end 24, along with an exterior surface 26 extending between the two ends. The shaft 18 is adapted to removably couple with a leg of a support structure (e.g., leg 14 of the tent 10 shown in FIG. 1). For example, the tent leg 14 may be hollow and the shaft 18 may be sized and shaped so that the second end 24 of the shaft 18 fits within the tent leg 14 in a telescoping manner. In the embodiment shown, the shaft 18 has a square cross-section, which allows it to fit within the square-shaped tent leg 14. For example, the tent leg 14 may have a width of about 1½ inches, while the shaft 18 may have a width of about 1⅜ inches. Of course, the shaft cross-section may have a variety of shapes (e.g., cylindrical) to fit a desired structure leg.

In some embodiments, the shaft 18 includes an opening 25 in the second end 24, to receive the tent leg 14 within the shaft 18 in a telescoping manner. For example, the shaft 18 may be a tube dimensioned slighted larger than the tent leg. The shaft 18 and/or tent leg 14 may include one or more holes 28 to provide height adjustment and allow the shaft 18 to be locked in place to the tent leg 14 with a fastener, such as a pin, bolt, screw, or other known device.

As shown in FIG. 4, the stub shaft 20 extends out from a top surface 30 of the base 16. In some embodiments, the shaft 18 includes a first opening 32 adapted to receive the stub shaft 20 with the base 16 in a generally horizontal orientation. For example, the first opening 32 may be positioned at the first end 22 of the shaft 18, which allows the shaft 18 to slip over the stub shaft 20 as the two shafts are brought together. In some embodiments the stub shaft 20 includes a fastening hole 34, and the tube shaft 18 includes a fastening hole 36 which allows the stub shaft 20 to be fastened to and retained within the tube shaft 18 via a fastener 38 such as a pin or other known device. Thus, the tube shaft 18 (and thus the tent leg 14 and tent 10) can be secured to the base 16 for supporting and stabilizing the tent 10 in a stationary position.

The base 16 may be formed in a number of configurations depending upon the desired implementation. The base is generally weighted, either inherently, or through the addition of removable weight, to provide a stable foundation for the base assembly 12 and coupled tent 10. The base 16 may have a variety of weights, depending upon the amount of stability and securing necessary for a particular embodiment. As just one example, the base 16 may weigh ten pounds or greater. Providing the base 16 with its own stabilizing weight allows the base assembly 12 to support and stabilize a free standing structure (e.g., tent 10) without the need for additional, extraneous weighted materials such as cinder blocks, sand bags, etc. Thus, the base assembly includes a fewer number of components and can be transported more easily than prior designs.

In some embodiments, the stub shaft 20 may be integrally formed with the base 16. For example, the base 16 and the stub shaft 20 may be cast together or otherwise fixed together (e.g., welded or bolted). The stub shaft 20 extends above the top surface 30 of the base 16 to allow the tube shaft 18 to couple with the stub shaft 20 and thus the base 16.

In the embodiment shown in the Figures, the stub shaft 20 is a separate component from the base 16, and the base 16 includes a bore 40, extending from the top surface 30 to a bottom surface 42, for receiving the stub shaft 20. In some embodiments, the stub shaft 20 includes a retaining plate 44 (e.g., integrally formed or otherwise attached) that engages with the bottom surface 42 of the base 16 in order to retain the stub shaft 20 within the base 16 when the stub shaft 20 is coupled with the tube shaft 18. Although not shown, in some embodiments, the base 16 may include a recess in its bottom surface 42 or feet attached to the bottom surface 42 to provide a stable footing for the base 16 on a support surface despite the retaining plate 44 engaging with the bottom surface 42.

Referring to FIGS. 2-5, in some embodiments, the base assembly 12 includes a bushing 46 insertable within the bore 40 of the base 16. In some cases, the bushing 46 helps stabilize the shaft 18 within the base 16. For example, the shaft 18 may have a cylindrical cross-section dimensioned to slip within the bushing 46. As shown in FIG. 5, in some embodiments, the shaft 18 has a square cross-section and is dimensioned to fit snugly within the bushing 46 at its corner edges to limit horizontal movement of the shaft 18. The stub shaft 20 may also be secured to the shaft 18 via the fastener 38, to limit the vertical movement of the shaft 18 with respect to the base 16.

Figure 6:
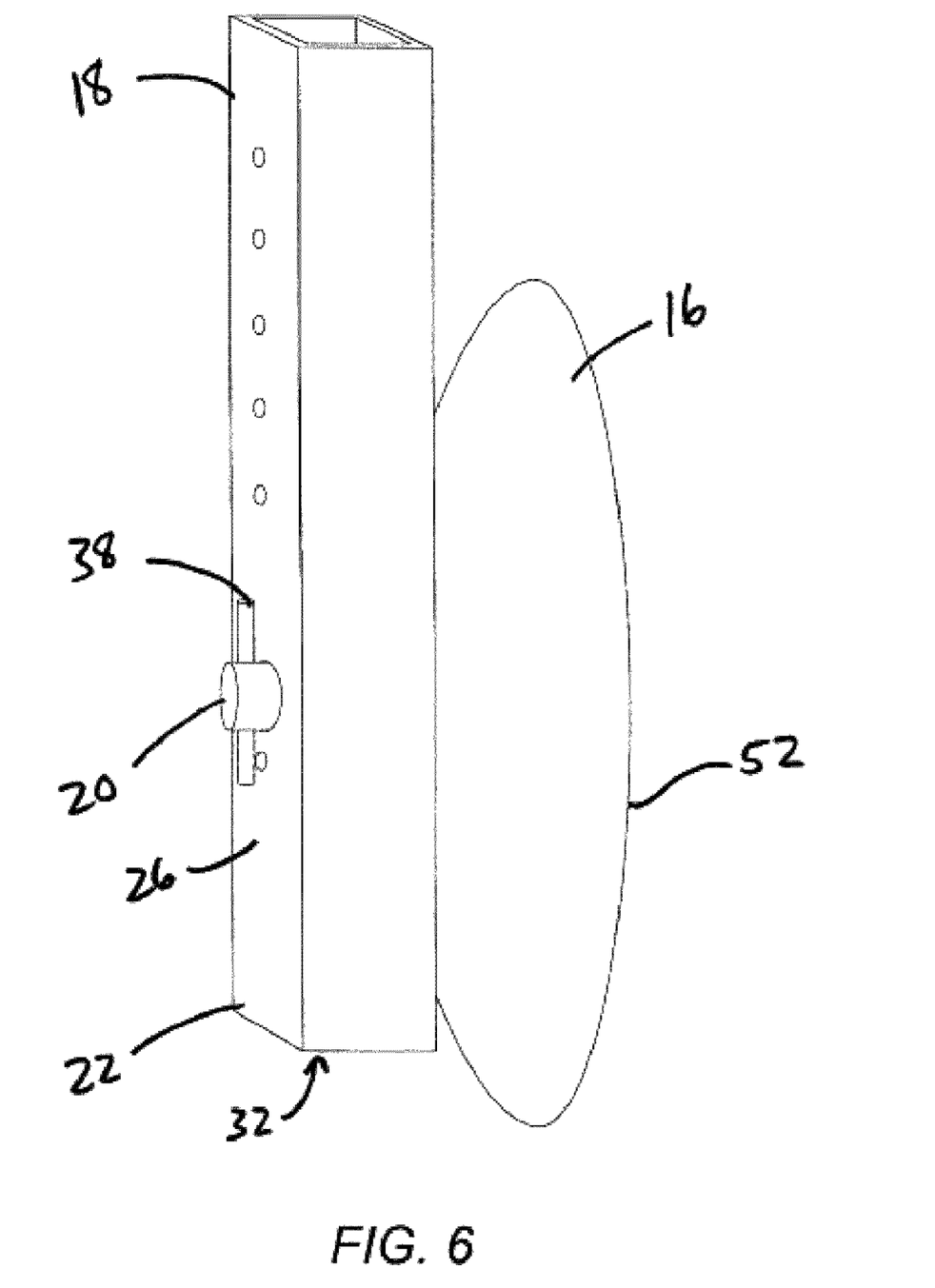
FIG. 6 is a perspective view of a base assembly in a vertical orientation according to an embodiment of the invention.
Figure 7:
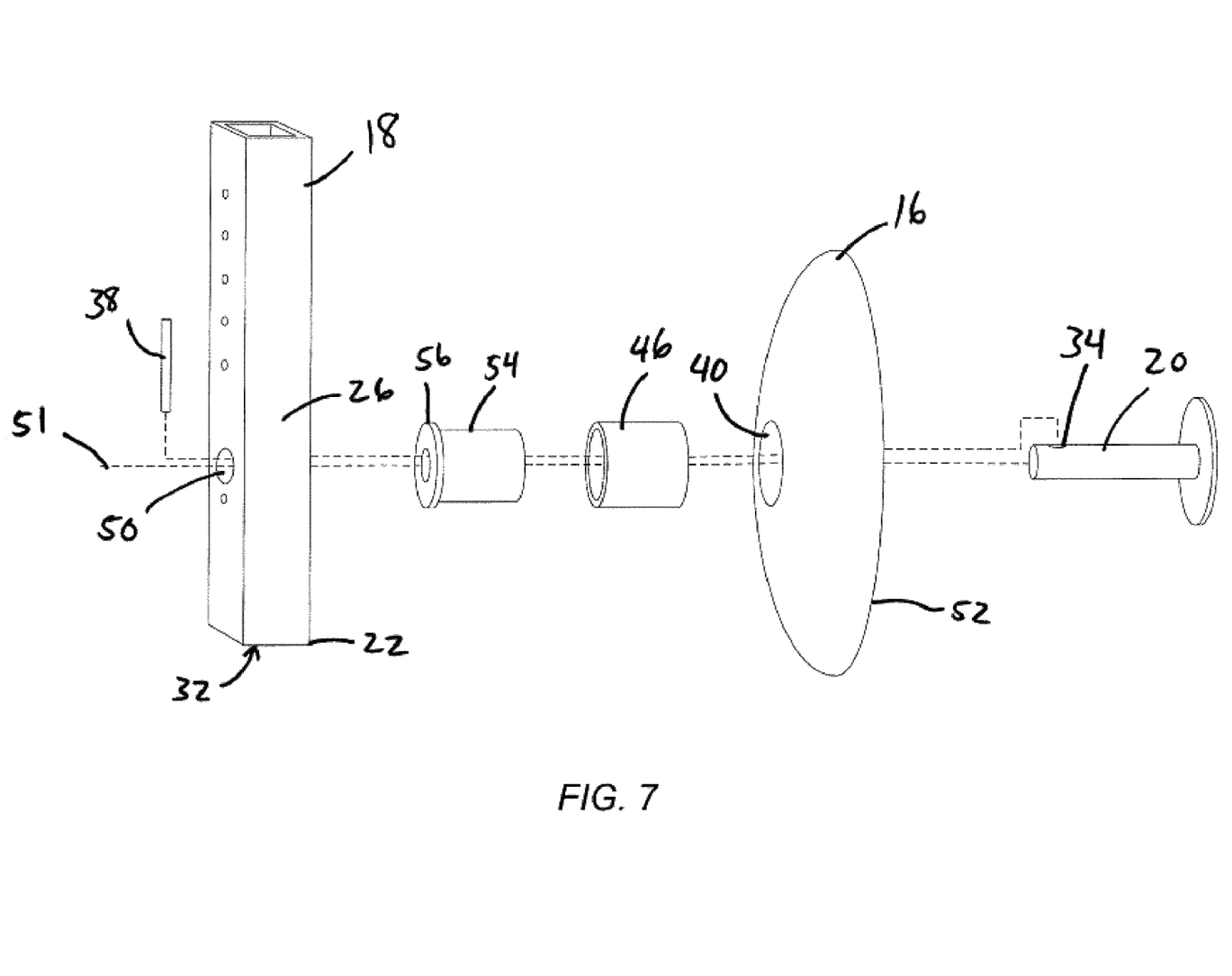
FIG. 7 is an exploded, perspective view of the base assembly of FIG. 6.
Figure 8:
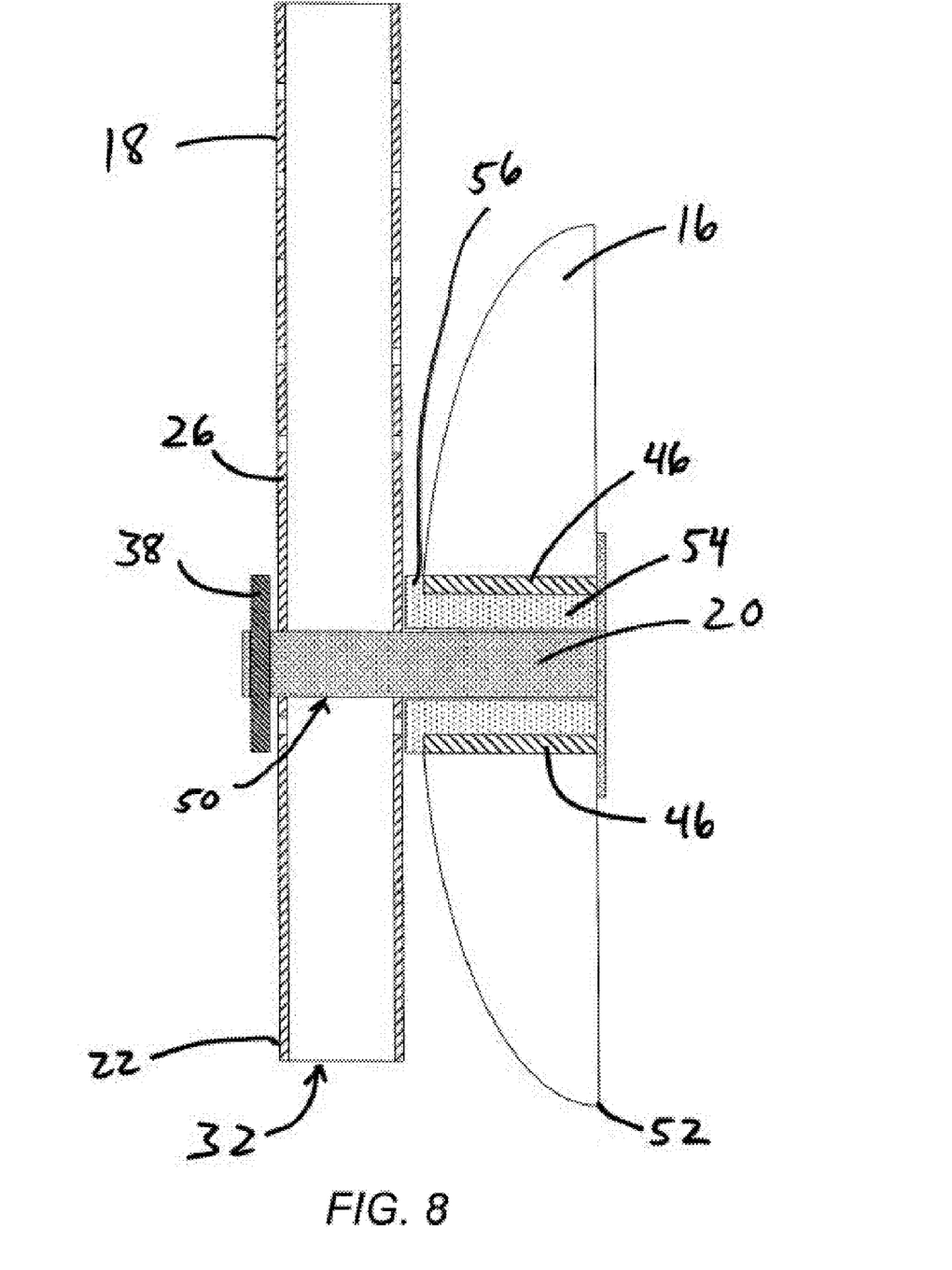
FIG. 8 is a cross-sectional view of the base assembly of FIG. 6.

Referring to FIGS. 2-4, in some embodiments, the shaft 18 (e.g., tube) includes a second opening 50 adapted to receive the stub shaft 20 with the base 16 in a generally vertical orientation. Referring now to FIGS. 6-8, providing a vertical orientation and rotating the base 16 provides a ready and easily set up configuration for transporting the base assembly 12 and any structure (e.g., tent 10) attached thereto. For example, the base 16 may include a generally circular perimeter 52 that allows the base 16 to roll upon a support surface, acting as a wheel to provide an easy mode of transportation.

In some embodiments, the second opening 50 extends into the exterior surface 26 of the shaft 18. The second opening 50 may extend completely through the shaft 18, transverse to the first opening 32, although this is not required. As shown in FIGS. 6 and 8, in some embodiments the stub shaft 20 extends into the second opening 50, through the cross-section of the shaft 18, and out the other side. The stub shaft 20 may be secured in this orientation with the fastener 38 inserted into the fastening hole 34 in the end of the stub shaft 20.

In general, in the vertical orientation, the base 16 rotates about its central axis 51 to allow easy transportation of the base assembly 12 and/or tent 10. The rotation may be provided in a number of manners. For example, in one embodiment, the stub shaft 20 is fixed (and/or integral) within the base 16, and the base 16 rotates as the stub shaft 20 rotates within the second opening 50 in the shaft 18. In another embodiment, the stub shaft 20 may be removably fixed within the tube shaft 18, unable to rotate, and the base 16 may rotate about the stub shaft 20. As shown in FIGS. 6-8, in another embodiment, both the base 16 and the stub shaft 20 may be free to rotate with respect to the tube shaft 18 and with respect to each other.

In the event the base 16 includes the bore 40 and rotates about the stub shaft 20, the base 16 may include the bushing 46 to facilitate rotation. The bushing 46 may comprise any suitable material. In some embodiments, for example, the bushing 46 may be made from bronze or steel. Of course, the bushing 46 may not be used, and the stub shaft 20 may simply rotate within the bore 40 of the base 16. In another embodiment, the base assembly 12 includes a spacer 54 that is insertable within the bushing 46 about the stub shaft 20. For example, referring to FIGS. 4, 5, and 8, in cases where the tube shaft 18 extends down into the bushing 46 (and/or bore 40) in the horizontal orientation, the spacer 54 can fill a gap between the stub shaft 20 and the bushing 46 in the generally vertical orientation to provide engagement between the stub shaft 20 and the bushing 46 when the base 16 rotates. The spacer 54 may also include a collar 56 extending between the shaft 18 and the base 16 to ensure the base 16 does not grind against the shaft 18. The spacer may be made of a plastic or any other suitable material.

In some embodiments, the second opening 50 is preferably positioned within the exterior surface 26 of the shaft 18 a fraction of the diameter of the base 16 above the first end 22 to ensure that the perimeter 52 of the base 16 extends down past the first end 22 of the shaft 18. For example, the base 16 may be about twelve inches in diameter and the second opening 50 may be positioned slightly less than six inches from the first end 22 of the shaft 18. The perimeter 52 of the base 16 can thus engage a support surface as it rolls without the first end 22 of the shaft 18 hindering movement along the support surface.

As previously mentioned, the base 16 may include a generally circular perimeter 52 which allows the base 16 to rotate or roll in the generally vertical orientation. In some cases the base 16 may include a flat edge (not shown), thus provided a rolling surface around the perimeter of the base 16. In other embodiments the top surface 30 and the bottom surface 42 may taper together at the perimeter of the base 16 and the base 16 may rotate upon this narrower edge. This embodiment can provide a smooth, low profile of the base 16 in the horizontal orientation, thus limiting tripping of the base 16. Of course, other shapes and configurations for the base 16 may be possible, including a multi-sided polygon (e.g., octagon).

Thus, the horizontal orientation for the base 16 provides a weighted, stationary support for the tube shaft 18 and any coupled tent (i.e., structure), while the vertical orientation of the base assembly 12 provides a ready mode of transportation for the base assembly 12 and any coupled structure. For example, when one or more base assemblies 12 are used to stabilize a collapsible tent, the tent may be collapsed, the bases 16 can be positioned in the generally vertical orientation, and the entire collapsible tent can be easily wheeled to a vehicle or storage facility.

Thus, embodiments of the BASE ASSEMBLY FOR SUPPORTING AND TRANSPORTING A FREE STANDING STRUCTURE are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A base assembly for supporting a free standing structure with at least one leg, comprising:
    a base having a top surface, a perimeter, and a bottom surface;
    a first shaft extending from the top surface of the base; and
    a second shaft adapted to removably couple to the leg of the free standing structure, the second shaft having a first opening adapted to receive the first shaft with the base in a generally horizontal orientation, and a second opening adapted to receive the first shaft with the base in a generally vertical orientation in which the base is rotatable with respect to the second shaft, wherein
    in the generally horizontal orientation the base is adapted to support the base assembly with the second shaft in a stable and upright orientation upon a support surface, and
    in the generally vertical orientation the perimeter of the base is adapted to roll on the support surface as the base rotates with respect to the second shaft, for transporting the base assembly.

2. The base assembly of claim 1, wherein the base in the generally vertical orientation is rotatable with respect to the first shaft.

3. The base assembly of claim 1, wherein the perimeter of the base comprises a generally circular shape.

4. The base assembly of claim 1, wherein the perimeter of the base comprises a rolling surface.

5. A base assembly for supporting a free standing structure with at least one leg, comprising:
    a base having a top surface and a bottom surface;
    a first shaft extending from the top surface of the base; and
    a second shaft adapted to removably couple to the leg of the free standing structure, the second shaft having a first opening adapted to receive the first shaft with the base in a generally horizontal orientation for supporting the base assembly in a stationary position, and a second opening adapted to receive the first shaft with the base in a generally vertical orientation for transporting the base assembly,
    wherein the second shaft has a first end, a second end and an exterior surface extending between the first and second ends, wherein the first end defines the first opening.

6. The base assembly of claim 5, wherein the exterior surface of the second shaft defines the second opening.

7. The base assembly of claim 6, wherein the second opening extends through the second shaft transverse to the first opening.

8. A base assembly for supporting a free standing structure with at least one leg, comprising:
    a base having a top surface and a bottom surface;
    a first shaft extending from the top surface of the base; and
    a second shaft adapted to removably couple to the leg of the free standing structure, the second shaft having a first opening adapted to receive the first shaft with the base in a generally horizontal orientation for supporting the base assembly in a stationary position, and a second opening adapted to receive the first shaft with the base in a generally vertical orientation for transporting the base assembly,
    wherein the base is a weighted base.

9. A base assembly for supporting a free standing structure with at least one leg, comprising:
    a weighted base having a top surface, a bottom surface, and a bore extending between the top surface and the bottom surface;
    a first shaft extending through the bore of the base; and
    a second shaft adapted to removably couple to the leg of the free standing structure, the second shaft having a first opening adapted to receive the first shaft with the base in a generally horizontal orientation for supporting the base assembly in a stationary position, and a second opening adapted to receive the first shaft with the base in a generally vertical orientation for transporting the base assembly.

10. The base assembly of claim 9, wherein the first shaft includes a first end extending out from the top surface of the base, a second end, and a plate coupled to the second end, wherein the plate engages the bottom surface of the base to retain the first shaft within the base.

11. The base assembly of claim 9, wherein the second shaft extends into the bore about the first shaft with the base in the generally horizontal orientation.

12. The base assembly of claim 9, further comprising a bushing within the bore about the first shaft.

13. The base assembly of claim 12, wherein the second shaft extends into the bushing about the first shaft with the base in the generally horizontal orientation.

14. The base assembly of claim 12, further comprising a spacer insertable into the bushing about the first shaft with the base in the generally vertical orientation.

15. The base assembly of claim 14, wherein the spacer includes a collar extending between the second shaft and the base in the generally vertical orientation.

16. The base assembly of claim 9, wherein the first shaft defines a hole and further comprising a fastener insertable into the hole for retaining the first shaft within the second shaft.

17. The base assembly of claim 9, wherein the base further comprises a perimeter and is rotatable with respect to the second shaft, and wherein in the generally horizontal orientation the base is adapted to support the base assembly with the second shaft in a stable and upright orientation upon a support surface, and in the generally vertical orientation the perimeter of the base is adapted to roll on the support surface as the base rotates with respect to the second shaft, for transporting the base assembly.

18. A base assembly for supporting a free standing structure with at least one leg, comprising:

a base having a generally circular perimeter, a top surface, a bottom surface, and a bore extending between the top surface and the bottom surface;

a stub shaft extending through the bore and out from the top surface of the base; and a tube adapted to removably couple the shaft and the base to the leg of the free standing structure, the tube having a wall defining a bore between a first end and a second end and an opening in the wall, the bore adapted to receive the shaft in the first end of the tube with the base in a generally horizontal orientation, and the opening adapted to receive the stub shaft with the base in a generally vertical orientation for transporting the base assembly.

19. The base assembly of claim 18, wherein a perimeter of the base in the generally vertical orientation extends below the first end of the tube.

20. The base assembly of claim 19, wherein the base in the generally vertical orientation is rotatable with respect to the tube.

21. The base assembly of claim 18, wherein the tube has a generally square cross-section.

22. The base assembly of claim 18, wherein the base is rotatable with respect to the tube, and wherein in the generally horizontal orientation the base is adapted to support the base assembly with the tube in a stable and upright orientation upon a support surface, and in the generally vertical orientation the perimeter of the base is adapted to roll on the support surface as the base rotates with respect to the tube, for transporting the base assembly.

* * * * *